United States Patent
Yano et al.

(10) Patent No.: US 8,505,839 B2
(45) Date of Patent: Aug. 13, 2013

(54) ELECTROSTATICALLY ATOMIZING DEVICE

(75) Inventors: Takeshi Yano, Kyoto (JP); Toshihisa Hirai, Hikone (JP); Kishiko Hirai, legal representative, Hikone (JO); Sumio Wada, Hikone (JP); Akihide Sugawa, Hikone (JP); Tatsuhiko Matsumoto, Habikino (JP); Shousuke Akisada, Hikone (JP)

(73) Assignee: Panasonic Corporation, Osaka (JP)

( * ) Notice: Subject to any disclaimer, the term of this patent is extended or adjusted under 35 U.S.C. 154(b) by 1056 days.

(21) Appl. No.: 12/091,418

(22) PCT Filed: Oct. 30, 2006

(86) PCT No.: PCT/JP2006/321621
§ 371 (c)(1),
(2), (4) Date: Apr. 24, 2008

(87) PCT Pub. No.: WO2007/052582
PCT Pub. Date: May 10, 2007

(65) Prior Publication Data
US 2010/0133367 A1     Jun. 3, 2010

(30) Foreign Application Priority Data

Oct. 31, 2005  (JP) ................................. 2005-317577

(51) Int. Cl.
*B05B 5/00*     (2006.01)
(52) U.S. Cl.
USPC ....................................... 239/690.1; 239/706
(58) Field of Classification Search
USPC .............. 239/690, 690.1, 704, 705, 706, 707, 239/700, 290, 291
See application file for complete search history.

(56) References Cited

U.S. PATENT DOCUMENTS

| 7,473,298 B2 * | 1/2009 | Suda et al. ......................... 95/64 |
| 7,494,532 B2 * | 2/2009 | Azukizawa et al. ............... 96/27 |
| 2006/0144971 A1 | 7/2006 | Nakada et al. |

FOREIGN PATENT DOCUMENTS

| EP | 1 733 798 A1 | 12/2006 |
| JP | 9-321348 A | 12/1997 |
| JP | 10-103721 A | 4/1998 |

(Continued)

OTHER PUBLICATIONS

Notification of the First Office Action for the Application No. 200600408809 from State Intellectual Property Office of People's Republic of China dated Jul. 17, 2009.

(Continued)

*Primary Examiner* — Davis Hwu
(74) *Attorney, Agent, or Firm* — McDermott Will & Emery LLP (57) ABSTRACT

An electrostatically atomizing device has a housing and an electrostatically atomizing unit accommodated within the housing. The electrostatically atomizing unit includes an atomizing barrel and an emitter electrode disposed within the atomizing barrel and is configured to atomize water supplied to the emitter electrode at a tip of the emitter electrode and generate mist of charged minute water particles. Formed within the housing is an air pressure chamber which surrounds the atomizing barrel. The atomizing barrel is formed in its peripheral wall with a plurality of air inlets which are arranged circumferentially around the atomizing barrel to introduce pressurized air from the air pressure chamber for carrying the mist on the pressurized air introduced into the atomizing barrel from the plural air inlets and discharging the mist outwardly of the housing.

8 Claims, 6 Drawing Sheets

(56) References Cited

FOREIGN PATENT DOCUMENTS

| | | |
|---|---|---|
| JP | 10-295432 A | 11/1998 |
| JP | 2004-358360 A | 12/2004 |
| JP | 2004-358362 A | 12/2004 |
| JP | 2004-358364 A | 12/2004 |
| JP | 2005-66586 A | 3/2005 |
| JP | 2005-131549 A | 5/2005 |
| JP | 2006-29663 A | 2/2006 |
| JP | 2007-21376 A | 2/2007 |
| JP | 4329672 B2 | 6/2009 |
| WO | WO-2005/097339 A1 | 10/2005 |

OTHER PUBLICATIONS

International Search Report for the Application No. PCT/JP2006/321621 dated Jan. 23, 2007.

Notification of Reasons for Refusal for the Application No. 2005-317511 from Japan Patent Office mailed Oct. 6, 2009.

* cited by examiner

ELECTROSTATICALLY ATOMIZING DEVICE

TECHNICAL FIELD

The present invention relates to an electrostatically atomizing device which electrostatically atomizes water so as to generate a mist of charged minute particles of nanometer sizes.

BACKGROUND ART

Conventionally, as disclosed in the International Patent Publication No. WO 2005/097339, an electrostatically atomizing device is known to electrostatically atomize water for generating a mist of charged minute particles of a nanometer size. The electrostatically atomizing device has an emitter electrode, a water feed means which is configured to give water on the emitter electrode, an atomizing barrel which defines an atomizing space in its interior and holds the emitter electrode in the space, and a high voltage applying section which applies a high voltage to the emitter electrode. With the high voltage applied to the emitter electrode, the water supplied on the emitter electrode is electrostatically atomized for generating the mist of charged minute particles of nanometer size.

In the electrostatically atomizing device, the water feed means is defined by a heat exchanger which has a refrigerating part and a heat radiating part. The refrigerating part is configured to cool the emitter electrode to allow the water to condense on the emitter electrode. Further, an air flow means is provided to give an air flow to the heat radiating part to promote heat radiation thereat and also to the atomizing space to carry the nanometer size ions generated in the atomizing space on the air flow for discharging the ions outwardly. For this purpose, the atomizing barrel is provided with air inlets which introduce the air flow from the air flow means in order to discharge the mist generated in the atomizing barrel out through an outlet port of the atomizing barrel.

However, in the conventional electrostatically atomizing device, although the air flow means forces the air to flow into the atomizing barrel, the air leaks outward throughout the pass which extends from the air flow means to the atomizing barrel to reduce the air of flowing thereinto. Accordingly, it becomes difficult to discharge the mists out of an outlet port efficiently. Furthermore, since it is difficult to uniformly introduce the air sent by the air flow means into the atomizing barrel, the air flow which is introduced from the air inlets into the atomizing barrel becomes turbulent so that the mists are not successfully discharged out of the outlet port, and the mists are attached to the inner wall of the atomizing barrel to reduce the mist of being discharged outwardly. Consequently, it is not capable of discharging the mists generated within the atomizing barrel outward efficiently.

DISCLOSURE OF THE INVENTION

In view of the above problem, the present invention has been accomplished to give a solution of providing an electrostatically atomizing device which is capable of efficiently discharging the mist outwardly. The electrostatically atomizing device in accordance with the present invention has a housing and an electrostatically atomizing unit accommodated within the housing. The electrostatically atomizing unit includes an emitter electrode, an opposed electrode disposed in an opposed relation to the emitter electrode, a water feed means configured to give water on said emitter electrode, and an atomizing barrel surrounding said emitter electrode. An outlet port is provided at one axial end of the atomizing barrel to be exposed to an exterior of the housing. A high voltage source is accommodated within the housing and configured to apply a high voltage across the emitter electrode and the opposed electrode to electrostatically atomize the water supplied to said emitter electrode at a discharge end of the emitter electrode for generating charged minute water particles which flows from the discharge end of the emitter electrode to the opposed electrode and through the opposed electrode to be discharged out of the outlet port of the atomizing barrel as being atomized.

The housing has an air pressure chamber surrounding the atomizing barrel and a fan supplying pressurized air to the air pressure chamber. A plural of air inlets are disposed in a peripheral wall of the atomizing barrel and are arranged circumferentially along a circumferential direction of the atomizing barrel to introduce the pressurized air from the air pressure chamber into the atomizing barrel such that mist of the charged minute particles is carried on the pressurized air introduced from the plural of the air inlets and is discharged out of the housing from the atomizing barrel.

With this arrangement, the air flows uniformly from the air pressure chamber into the atomizing barrel though the air inlets disposed in the peripheral wall of the atomizing barrel, which enables to discharge efficiently the mist generated within the atomizing barrel out of the outlet port. In short, the pressurized air introduced into the atomizing barrel can be well prevented from becoming turbulent within the atomizing barrel, and can avoid the adhesion of the mist on the interior wall of the atomizing barrel and accordingly the reduction in the amount of the mist to be discharged out through the outlet port, thereby making it possible to discharge the mist generated in the atomizing barrel outwardly in an efficient manner.

Preferably, the plural air inlets are disposed in a diametrically opposed relation with each other about an axis of the atomizing barrel so as to introduce the pressurized air effectively into the atomizing barrel through the uniformly spaced air inlets. Thus, it is possible to generate the forced air flow flowing from the emitter electrode at the center of the atomizing barrel and advancing outwardly through the outlet port without causing an eddy flow or turbulent flow, thereby discharging the mist efficiently outwardly of the housing.

The water feed means is preferably realized by a heat exchanger having a refrigerating part and a heat radiating part. In this instance, the refrigerating part is configured to cool the emitter electrode for allowing the water to condense on the emitter electrode. The housing is formed therein with an air flow path which is isolated from the air pressure chamber for cooling the heat radiating part, and also with a first air intake and a second air intake provided downstream of the fan respectively for flowing the pressurized air into the air pressure chamber and for flowing the pressurized air into the air flow path. Accordingly, the forced air flow produced by the fan is capable of discharging the mist out of the atomizing barrel and at the same time cooling the heat radiating part, thereby discharging the mist out of the housing efficiently.

In a preferred embodiment, the atomizing barrel is formed to have a rounded surface on its peripheral wall, and the air pressure chamber is formed at its one end with a first air intake. In this instance, the interior wall of the air pressure chamber is curved at a portion opposite of the first air intake from the atomizing barrel and is spaced substantially at a uniform distance from the exterior wall of the atomizing barrel. Thus, it is possible to restrain the turbulent flow at the portion of the air pressure chamber opposite of the first air intake, thereby introducing the pressurized air into the atomizing barrel efficiently so that the mist can be discharged outward effectively.

Furthermore, the air inlets are preferably disposed in the peripheral wall of the atomizing barrel at a portion not opposed to the first air intake. In this instance, the pressurized air flow flowing through the first air intake is allowed to advance directly into the atomizing barrel, thereby avoiding the turbulent flow within the atomizing barrel, and therefore enabling to efficiently discharge the mist outwardly of the atomizing barrel.

BEST MODE FOR CARRYING OUT THE INVENTION

Figure 1:
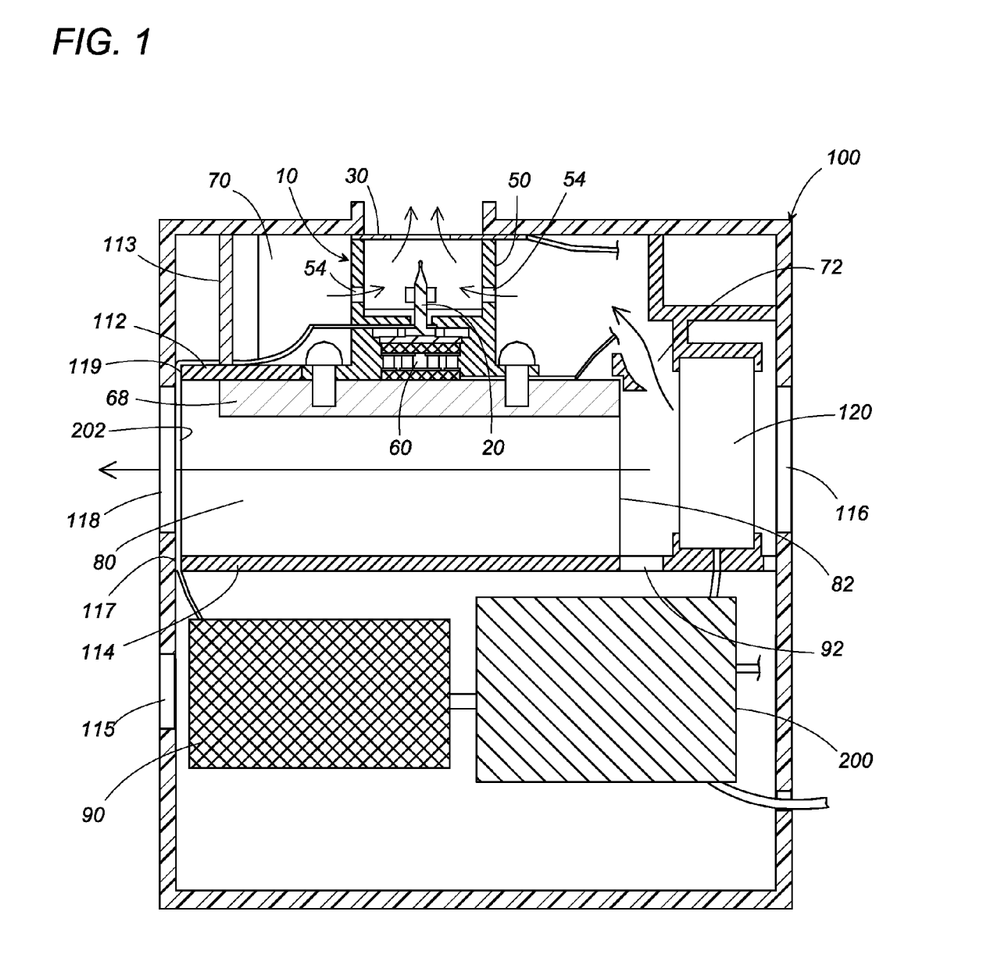
FIG. 1 is a longitudinal cross sectional view of an electrostatically atomizing device in accordance with a first embodiment of the present invention.
Figure 4:
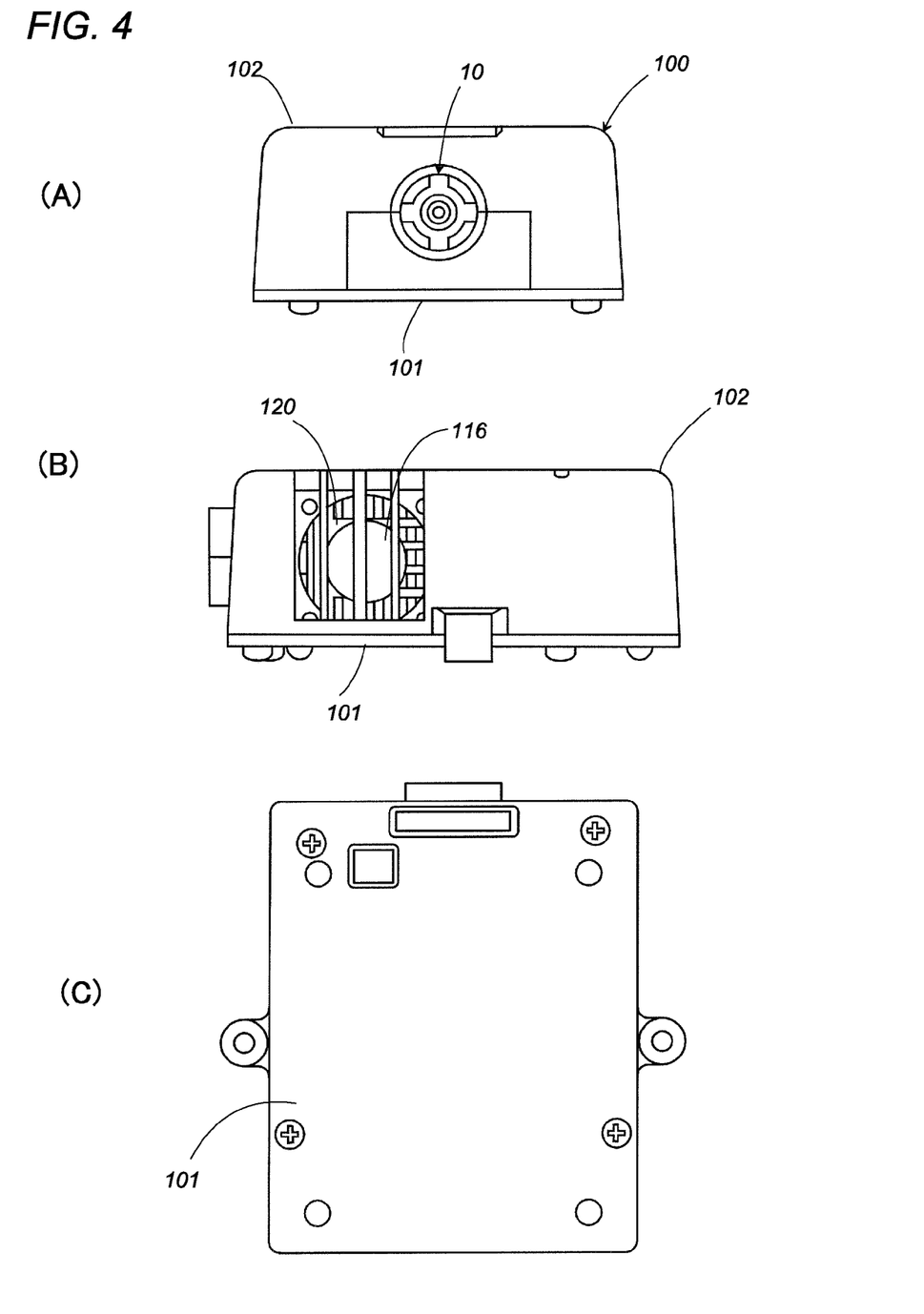
FIG. 4 shows an external view of the above device, wherein (A) is a front view, (B) is a right-hand side view, and (C) is a bottom face view.

An electrostatically atomizing device in accordance with a first embodiment of the present invention is explained with reference to the attached drawings. As shown in FIG. 1, the electrostatically atomizing device includes an electrostatically atomizing unit 10 and a housing 100 which accommodates the unit. The housing 100 has, as shown in FIG. 4, a casing body 101 and a casing cap 102 which covers one side of the casing body 101.

Figure 2:
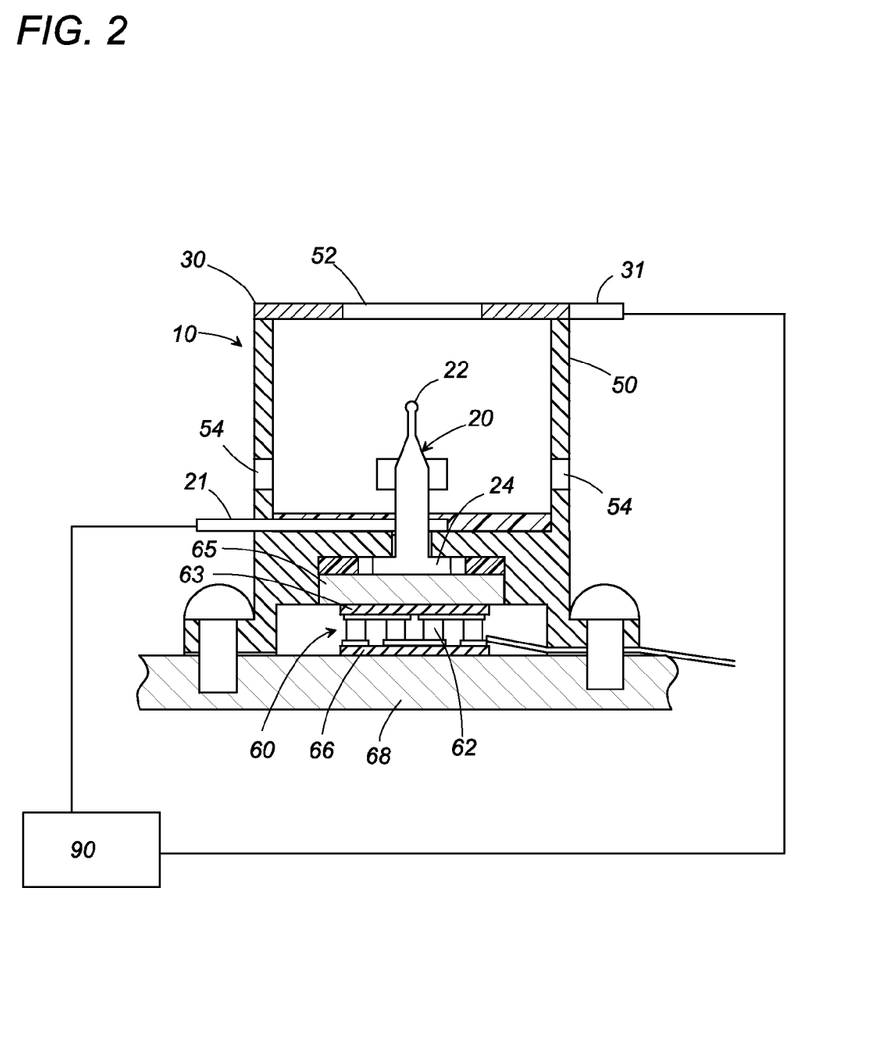
FIG. 2 is a cross sectional view of an electrostatically atomizing unit used in the above device.

As best shown in FIG. 2, the electrostatically atomizing unit 10 includes an emitter electrode 20, an opposed electrode 30, and an atomizing barrel 50 which carries a heat exchanger 40. The emitter electrode 20 is disposed on a central axis of the atomizing barrel 50, and has its rear end fixed to a bottom face 51 of the atomizing barrel 50 so as to project its tip within the atomizing barrel 50. The opposed electrode 30 is configured into a ring shape having a circular window in its center, and is fixed to the front end of the atomizing barrel 50 with the center of the circular window aligned with the central axis of the atomizing barrel, and is spaced from a discharge end at the tip of the emitter electrode 20 along the axial direction of the atomizing barrel 50. This circular window defines an outlet port of the end of the atomizing barrel 50. The emitter electrode 20 and the opposed electrode 30 are connected to a high voltage source 90 through an electrode terminal 21 and earth terminal 31, respectively. The high voltage source 90 includes a transformer to apply a predetermined voltage between the emitter electrode 20 and the opposed electrode 30 which is grounded, for example, a negative voltage (e.g. −4.6 kV) to the emitter electrode 20 so as to generate a high-voltage electric field between the discharge end 22 at the tip of the emitter electrode 20 and the opposed electrode 30 grounded. As will be discussed later, the water supplied on the emitter electrode 20 is charged electrostatically such that the charged minute particles of the water are discharged out from the discharge end 22 in the form of a mist.

In this instance, as shown in FIG. 5, Coulomb force works between the water W held at the tip of the emitter electrode 20 and the opposed electrode 30 due to the high voltage applied between the emitter electrode 20 and the opposed electrode 30, so that the surface of the water W protuberates locally to shape a Taylor cone T. In this consequence, an electric charge is concentrated at a tip of the Taylor cone T to boost the field intensity at this portion for further growing the Taylor cone T. Upon the Coulomb force exceeding the surface tension of the water W, the Taylor cone T is caused to disintegrate repeatedly (Rayleigh disintegration) to generate a large amount of the mist including charged minute water particles of a size in the order of nanometers. The mist goes toward the opposed electrodes 30 and is discharged outwardly through the outlet port 52. A plural of air inlets 54 are disposed in the peripheral wall of the atomizing barrel 50 to introduce the pressurized air so that the mist is carried on the air to be discharged out of the outlet port 52.

Mounted on the back side of the bottom wall of the atomizing barrel 50 is a heat exchanger 60 composed of a Peltier-effect thermoelectric module having a cooling side which is coupled to the emitter electrode 20 to cool the emitter electrode 20 below a dew point temperature of water for condensing the moisture in the ambient air on the emitter electrode. In this sense, the heat exchanger 60 defines a water feed means which supplies the water onto the emitter electrode 20. The heat exchanger 60 is composed of a plurality of thermoelectric elements 62 connected in parallel between a pair of electrically conductive circuit plates, and operates to cool the emitter electrode 20 at a cooling rate determined by a variable voltage given from a control module 200 accommodated in the housing. One of the conductive circuit plates at the cooling side is thermally coupled to a flange at the rear end of the emitter electrode 20 through dielectric members 63 and 65, while the other conductive circuit plate on the heat radiating side is thermally coupled to a heat radiating plate 68 through a dielectric member 66. The radiating plate 68 is fixed to the rear end of the atomizing barrel 50 to hold the heat exchanger 60 between the heat radiating plate and the bottom wall 51 of the atomizing barrel 50. The heat radiating plate 68 may be provided with heat radiating fins for accelerating heat radiation. The controller module 200 is configured to control the heat exchanger 60 in order to keep the electrode at a suitable temperature in accordance with the ambient temperature and humidity, i.e., the temperate at which a sufficient amount of water is condensed on the emitter electrode.

As shown in FIG. 1, the electrostatically atomizing unit 10 of the above configuration is disposed in the center of the front end part (upward end in FIG. 1) of the housing 100 where the fan 120 is incorporated, so as to align the outlet port 52 at the front end of the atomizing barrel 50 with an opening formed in the front end of the housing 100. The housing 100 is provided with a front partition wall 112 and a back partition wall 114. The front partition wall 112 is combined to the rear end of the atomizing barrel 50 and also to the heat radiating plate 68, thereby forming an air pressure chamber 70 around the atomizing barrel 50 for introducing the pressurized air generated by the fan 120 into the air pressure chamber 70.

The air pressure chamber 70 is configured to take in the pressurized air only from a first air intake 72 disposed in an adjacent relation to the fan 120, and is isolated from other parts within the housing 100 so as not to take in an air through the other portion. The fan 120 takes in the air through an air intake 116 located on one side of the housing 100 to supply the pressurized air through the first air intake 72 into the air pressure chamber 70. The pressurized air is introduced through air inlets 54 of the electrostatically atomizing unit 10 into the atomizing barrel 50 and produces an air flow discharged from the outlet port 52 of the atomizing barrel 50. Thus, the mist is carried on the air flow to be discharged out of the housing 100.

A linear air flow path 80 is formed between the front partition wall 112, the heat radiating plate 68 and the back partition wall 114 to take in the air from the fan 120 through a second air intake 82 at one end of the air flow path and discharge it through an opening at the other end of the air flow path 80 and outwardly through an outlet port 118 formed in the side of the housing 100. The back partition wall 114 is formed to extend over the full length in the lateral direction of the housing 100 to define a first space forwardly of the back partition wall for accommodating the electrostatically atomizing unit 10, the fan 120, the air pressure chamber 70, and the air flow path 80, and to define a second space rearwardly of the partition 114 for accommodating the high voltage source 90. With this consequence, the electrostatically atomizing unit 10 and the high voltage source 90 are disposed, in an isolated relation from each other, on opposite sides of the linear air flow path 80, i.e., within the front first space and the rear second space on opposite sides of the air flow path 80.

Within the space formed in the housing 100 rearwardly of the back partition wall 114, there is accommodated, in addition to the high voltage source 90, a controller module 200 which controls the cooling temperature of the emitter electrode 20 by the heat exchanger 60 as well as the air flow generated by the fan 120. The controller module 200 is configured to integrate a temperature control circuit and a rotation control circuit. The temperature control circuit controls the temperature of the cooling side of the heat exchanger 60 in order to allow the water to condense on the emitter electrode 20 depending upon the ambient temperature and humidity, while the rotation control circuit controls the rotation speed of the fan 120 depending upon the temperature of the emitter electrode 20. These control circuits give the control signals based upon a temperature sensor and a humidity sensor provided within the housing 100 for control of the heat exchanger 60 and the fan 120. A third air intake 92 is formed in the back partition wall 114 to take in the air flow from the fan 120 and accelerates the radiation of heat generated within the space. The air introduced into the space is discharged outwardly through an outlet port 115 disposed on the side of the housing 100. The first air intake 72 and the third air intake 92 are provided upstream of the second air intake 82 of the air flow path 80 to supply fresh air to the electrostatically atomizing unit 10 as well as the high voltage source 90 and the controller module 200.

The controller module 200 is provided upstream of the high voltage source 90 within the air flow path from the third air intake 92 to the outlet port 115 so as to be protected from the heat of the high voltage source 90 of a large heat capacity, assuring a stable control performance. A hole 117 in the form of a notch is provided at one end of the rear partition wall 114 opposite to the one end of the housing 100 where the outlet port 115 is provided. A lead 202 leading from the high voltage source 200 is routed through the hole 117 and a hole 119 at one end of the front partition wall 112 for connection with the electrostatically atomizing unit 10.

Figure 3:
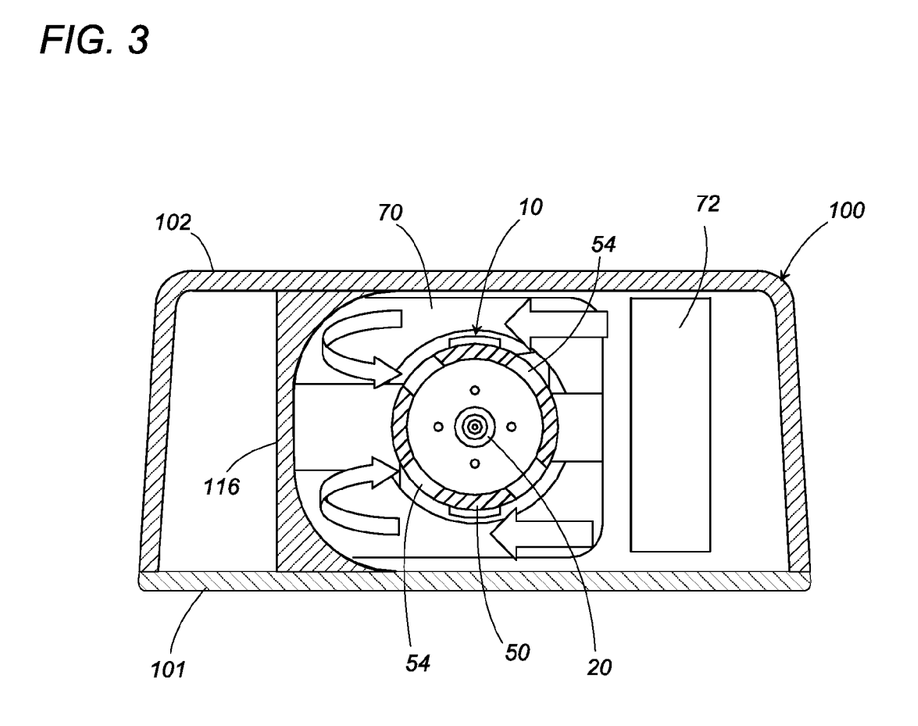
FIG. 3 is a top view of the above device with a portion being cut out away.

As shown in FIG. 3, the air inlets 54 are equiangularly spaced along the circumference of the atomizing barrel 50 to be diametrically opposed with each other about the axis of the atomizing barrel 50. Thus, the pressurized air is caused to flow uniformly towards the emitter electrode 20 at the axial center of the atomizing barrel 50, restraining an eddy flow within the atomizing barrel 50 and therefore enabling to generate the air flow effectively for discharging the mist out of the outlet port 52. Further, as shown in this figure, a side wall 113 has its interior surface curved at a portion opposite of the first air intake 72 from the electrostatically atomizing unit 10 to give a curved surface spaced roughly by a constant distance from the exterior of the atomizing barrel 50, thereby avoiding a turbulent flow in the space confined therebetween and permitting the pressurized air to be effectively introduced in the atomizing barrel 50 through the air inlets 54, and therefore enabling to discharge the mist generated at the atomizing barrel 50 outwardly in an effective manner.

Figure 5:
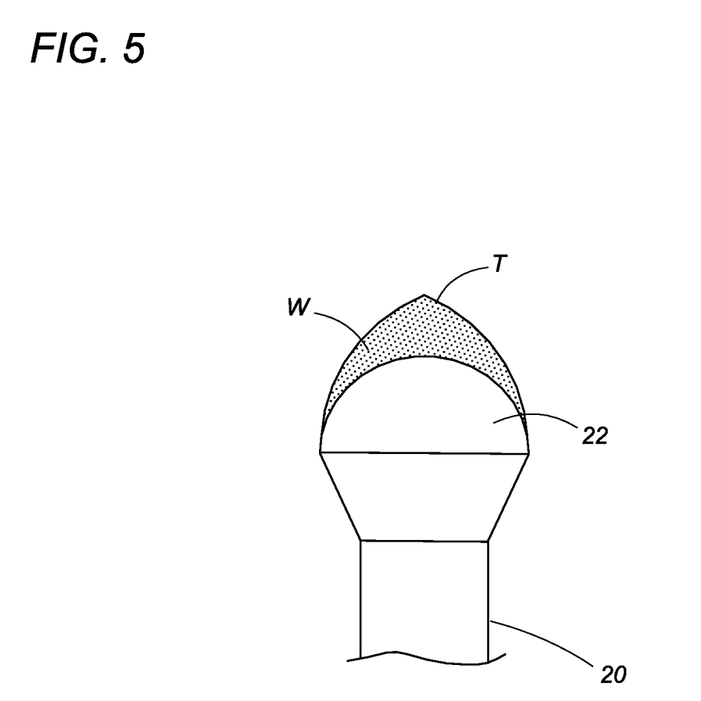
FIG. 5 is a schematic view explaining a shape of Taylor's corn generated at the emitter electrode of the above device.
Figure 6:
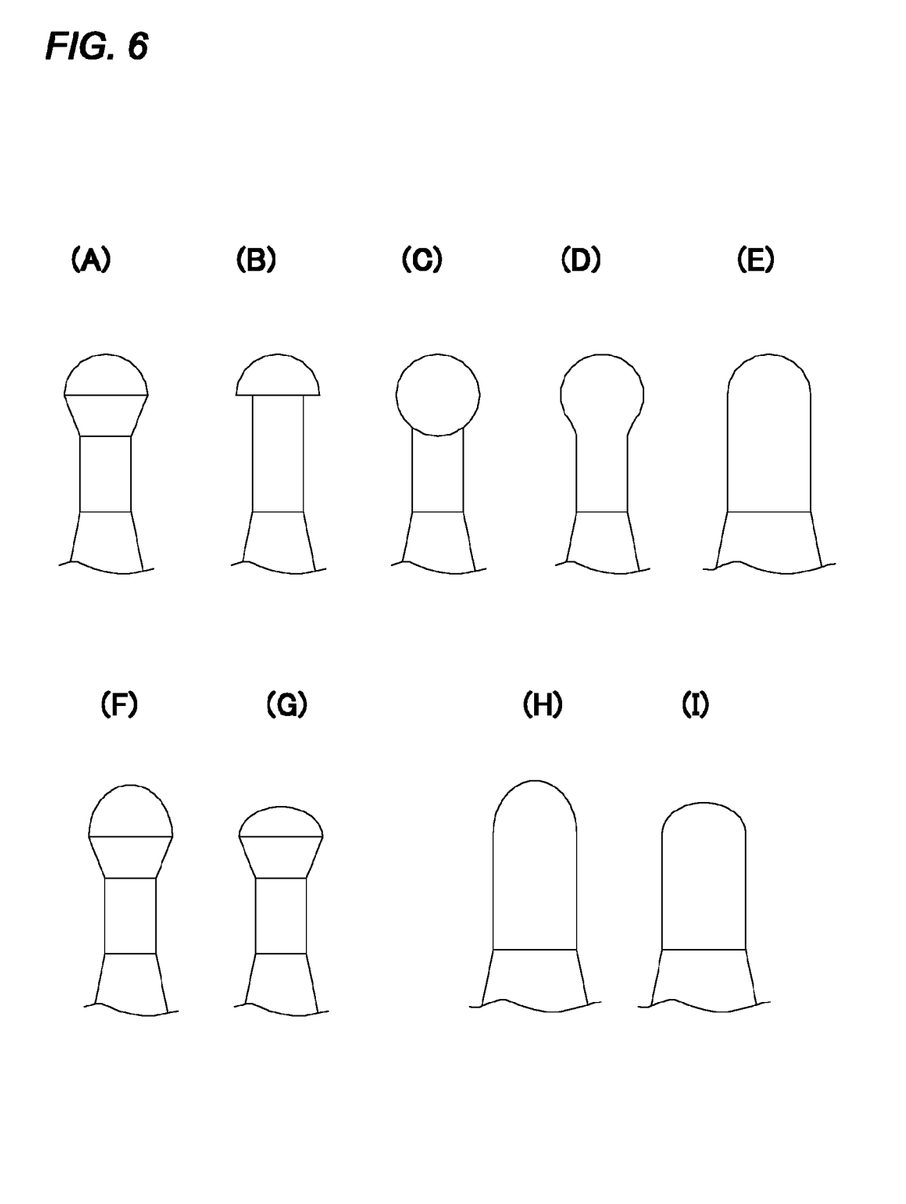
FIGS. 6(A) to 6(I) are front views respectively showing one example of the emitter electrode used in the above device with a portion being removed.

Although the above embodiment illustrates that the air inlets 52 are provided in the atomizing barrel 50 also at a portion opposed to the first air intake 72, the present invention should not be limited thereto and may be configured to have more than one air inlets 54 only at a portion exposed to a space opposite of the first air intake 72 from the electrostatically atomizing unit 10. In this instance, the pressurized air supplied through the first air intake 72 is prohibited from going into the atomizing barrel 50 directly through the first air intake 72, thereby further reducing the turbulent flow within the atomizing barrel 50. The emitter electrode 20 is preferably formed with a concave 28 immediately behind the discharge end 22 of a rounded tip. With the provision of the concave, the water condensed on the emitter electrode 20 at a portion other than the discharge end 22 is restrained from being excessively absorbed into the Taylor cone formed at the discharge end 22, assuring stable formation of the Taylor cone T of the constant size and shape to stably generate the negative ion mist of the reduced particle size of nanometer order.

The emitter electrode 20 of the other shapes as shown in FIG. 6(A)~(I) may be utilized.

The invention claimed is:

1. An electrostatically atomizing device comprising:
a housing;
an electrostatically atomizing unit accommodated within said housing;
said electrostatically atomizing unit including an emitter electrode, an opposed electrode disposed in an opposed relation to said emitter electrode, a water feed means configured to give water on said emitter electrode, and an atomizing barrel surrounding said emitter electrode, said atomizing barrel provided at its one axial end with an outlet port exposed to an exterior of said housing,
a high voltage source being accommodated within said housing and configured to apply a high voltage across said emitter electrode and said opposed electrode to electrostatically atomize the water supplied to said emitter electrode at a discharge end of said emitter electrode for producing charged minute water particles which flows from the end of said emitter electrode and through said opposed electrode to be discharged out of said outlet port at an end of said atomizing barrel as being atomized,
wherein
an air pressure chamber is provided within said housing to surround said atomizing barrel,
a fan is disposed to supply pressurized air to said air pressure chamber,
a plural of air inlets are disposed in a peripheral wall of said atomizing barrel and are arranged circumferentially along a circumferential direction of said atomizing barrel to introduce the pressurized air from said air pressure chamber into said atomizing barrel such that mist of said charged minute particles is carried on the pressurized air introduced from the plural of air inlets and is discharged out of said housing from said atomizing barrel, wherein said air inlets are disposed in a diametrically opposed relation with each other about an axis of said atomizing barrel.

2. The electrostatically atomizing device in claim 1, wherein said water feed means is a heat exchanger having a refrigerating part and a heat radiating part;

said refrigerating part being configured to cool the emitter electrode for allowing the water to condense on the emitter electrode, and said housing is formed therein with an air flow path which is separated from said air pressure chamber for cooling said heat radiating member, a first air intake and a second air intake are provided downstream of said fan respectively for flowing said pressurized air into said air pressure chamber and for flowing the pressurized air into said air flow path.

3. The electrostatically atomizing device in claim 2, wherein said atomizing barrel has its peripheral wall of rounded outer surface, said first air intake is provided at one end of said air pressure chamber, said air pressure chamber has its internal wall surface which is curved at a portion opposite of said first air intake from said atomizing barrel to be spaced substantially at a uniform distance from the exterior wall of said atomizing barrel.

4. The electrostatically atomizing device in claim 2, wherein said first air intake is provided at the end of said air pressure chamber, said air inlets are disposed in the peripheral wall of said atomizing barrel at a portion not opposed to said first air intake.

5. An electrostatically atomizing device comprising:
a housing;
an electrostatically atomizing unit accommodated within said housing;

said electrostatically atomizing unit including an emitter electrode, an opposed electrode disposed in an opposed relation to said emitter electrode, a water feed means configured to give water on said emitter electrode, and an atomizing barrel surrounding said emitter electrode, said atomizing barrel provided at its one axial end with an outlet port exposed to an exterior of said housing, and also its one axial end which holds said opposed electrode, a high voltage source being accommodated within said housing and configured to apply a high voltage across said emitter electrode and said opposed electrode to electrostatically atomize the water supplied to said emitter electrode at a discharge end of said emitter electrode for producing charged minute water particles which flows from the end of said emitter electrode and through said opposed electrode to be discharged out of said outlet port at an end of said atomizing barrel as being atomized, wherein an air pressure chamber is provided within said housing to surround said atomizing barrel, a fan is disposed to supply pressurized air to said air pressure chamber, a plural of air inlets are disposed in a peripheral wall of said atomizing barrel and are arranged circumferentially along a circumferential direction of said atomizing barrel to introduce the pressurized air from said air pressure chamber into said atomizing barrel such that mist of said charged minute particles is carried on the pressurized air introduced from the plural of air inlets and is discharged out of said housing from said atomizing barrel.

6. An electrostatically atomizing device comprising:

a housing;

an electrostatically atomizing unit accommodated within said housing;

said electrostatically atomizing unit including an emitter electrode, an opposed electrode disposed in an opposed relation to said emitter electrode, a water feed means configured to give water on said emitter electrode, and an atomizing barrel surrounding said emitter electrode, said atomizing barrel provided at its one axial end with an outlet port exposed to an exterior of said housing, said emitter electrode having a pole shape, whereby said emitter electrode has a first end, a second end, and an intermediate portion, said second end being opposite of said first end, said intermediate portion being located between said first end and said second end, said first end of said emitter electrode being defined as a discharge end. of said emitter electrode, a high voltage source being accommodated within said housing and configured to apply a high voltage across said emitter electrode and said opposed electrode to electrostatically atomize the water supplied to said emitter electrode at the discharge end of said emitter electrode for producing charged minute water particles which flows from the discharge end of said emitter electrode and through said opposed electrode to be discharged out of said outlet port at an end of said atomizing barrel as being atomized, wherein an air pressure chamber is provided within said housing to surround said atomizing barrel, a fan is disposed to supply pressurized air to said air pressure chamber, a plural of air inlets are disposed in a peripheral wall of said atomizing barrel and are arranged circumferentially along a circumferential direction of said atomizing barrel to introduce the pressurized air from said air pressure chamber into said atomizing barrel such that mist of said charged minute particles is carried on the pressurized air introduced from the plural of air inlets and is discharged out of said housing from said atomizing barrel, wherein said atomizing barrel is shaped to have the peripheral wall which surrounds an entire circumference surface of said emitter electrode, and said peripheral wall is provided with said air inlets which are faced with said intermediate portion.

7. The electrostatically atomizing device as set forth in claim 6, wherein said atomizing barrel is shaped to have the peripheral wall which surrounds an entire circumference of said discharge end of said emitter electrode.

8. The electrostatically atomizing device as set forth in claim 6, wherein said water supply means is defined by a heat exchanger which has a refrigerating part and a heat radiating part, and said refrigerating part of said heat exchanger is configured to cool the emitter electrode to allow the water to condense on the emitter electrode.

* * * * *